(12) United States Patent
Ward et al.

(10) Patent No.: US 12,331,226 B2
(45) Date of Patent: Jun. 17, 2025

(54) POLYURETHANE ADHESIVE WITH SEMI-CRYSTALLINE AND HIGHLY CRYSTALLINE POLYESTERS

(71) Applicant: Henkel AG & Co. KGaA, Duesseldorf (DE)

(72) Inventors: James Ward, Duesseldorf (DE); Timo Pasemann, Oberhausen (DE); Christian Holtgrewe, Duesseldorf (DE); Anja Cosima Lindhorst, Duesseldorf (DE)

(73) Assignee: Henkel AG & Co. KGaA, Duesseldorf (DE)

(*) Notice: Subject to any disclaimer, the term of this patent is extended or adjusted under 35 U.S.C. 154(b) by 640 days.

(21) Appl. No.: 17/341,457

(22) Filed: Jun. 8, 2021

(65) Prior Publication Data

US 2021/0292622 A1 Sep. 23, 2021

Related U.S. Application Data

(63) Continuation of application No. PCT/EP2019/074449, filed on Sep. 13, 2019.

(30) Foreign Application Priority Data

Dec. 10, 2018 (EP) .................................... 18211280

(51) Int. Cl.
| | | |
|---|---|---|
| *C09J 175/06* | (2006.01) | |
| *C08G 18/12* | (2006.01) | |
| *C08G 18/42* | (2006.01) | |
| *C08G 18/62* | (2006.01) | |
| *C08G 18/72* | (2006.01) | |
| *C09J 7/35* | (2018.01) | |

(52) U.S. Cl.
CPC ............ *C09J 175/06* (2013.01); *C08G 18/12* (2013.01); *C08G 18/4202* (2013.01); *C08G 18/6225* (2013.01); *C08G 18/72* (2013.01); *C09J 7/35* (2018.01); *C08G 2170/00* (2013.01); *C09J 2203/326* (2013.01)

(58) Field of Classification Search
CPC .................................................. C08G 18/4202
See application file for complete search history.

(56) References Cited

U.S. PATENT DOCUMENTS

| | | | | |
|---|---|---|---|---|
| 5,510,187 A | * | 4/1996 | Kumar ................. | G11B 5/7022 |
| | | | | 428/844.7 |
| 6,221,978 B1 | * | 4/2001 | Li ......................... | C08G 18/12 |
| | | | | 528/80 |
| 8,633,270 B2 | * | 1/2014 | Lochtman ............. | C09D 11/52 |
| | | | | 524/439 |
| 10,087,349 B2 | | 10/2018 | Brenner et al. | |
| 2002/0032275 A1 | | 3/2002 | Falcone et al. | |
| 2004/0214978 A1 | | 10/2004 | Rosin et al. | |
| 2010/0316410 A1 | | 12/2010 | Tong et al. | |
| 2016/0251552 A1 | * | 9/2016 | Das .......................... | B32B 7/12 |
| | | | | 428/221 |
| 2017/0058162 A1 | | 3/2017 | Slark et al. | |
| 2017/0066950 A1 | * | 3/2017 | Bae ......................... | C08G 63/64 |
| 2017/0259541 A1 | * | 9/2017 | Leano ..................... | C08L 23/08 |

FOREIGN PATENT DOCUMENTS

| | | |
|---|---|---|
| CN | 1550535 A | 12/2004 |
| CN | 106459723 A | 2/2017 |
| CN | 106795269 A | 5/2017 |
| WO | 2016138445 A1 | 9/2016 |
| WO | 2017044330 A1 | 3/2017 |
| WO | 2018148231 A1 | 8/2018 |

OTHER PUBLICATIONS

International Search Report for International PCT Patent Application No. PCT/EP2019/074449 dated Nov. 26, 2019.

* cited by examiner

*Primary Examiner* — Michael M Dollinger
(74) *Attorney, Agent, or Firm* — Sun Hee Lehmann

(57) ABSTRACT

The present invention refers to polyurethane adhesives with semi-crystalline and highly crystalline polyesters, a method for the production of the same as well as the use of the polyurethane adhesive in the production of electronic devices.

20 Claims, No Drawings

POLYURETHANE ADHESIVE WITH SEMI-CRYSTALLINE AND HIGHLY CRYSTALLINE POLYESTERS

The present invention refers to polyurethane adhesives with semi-crystalline and highly crystalline polyesters, a method for the production of the same as well as the use of the polyurethane adhesive in the production of electronic devices.

Polyurethane adhesives are known for their ability to bond to various substrates, showing good tensile and tensile shear strength, with final strength being reached within 24 hours to one week.

US 2002/0032275 discloses a thermosetting hot melt coating composition with a binder comprising 40 to 95%, by total resin weight of at least one amorphous resin; and 5 to 60%, by total resin weight of at least one semi-crystalline resin and/or one or more crystalline resins. Internally blocked isocyanates are preferably used as cross-linkers.

WO 2017/044330 claims a semi-crystalline polyester polyol comprising recurring units of: (a) a $C_2$-$C_{10}$ aliphatic diol; (b) a $C_8$-$C_{24}$ aliphatic dicarboxylic acid; and (c) an aromatic dicarboxylic acid source, a polycarbonate, or a composition thereof, the aromatic dicarboxylic acid source or polycarbonate being used in amounts of 1 to 20 wt.-%, based on the combined amounts of components (b) and (c); and the polyol having a hydroxyl number within the range of 14 to 112 mg KOH/g. Further claimed is a reactive hot-melt adhesive comprising the reaction product of (a) a polyisocyanate, and (b) the semi-crystalline polyester polyol as defined above, wherein, prior to curing, the adhesive has a free NCO content within the range of 0.5 to 8.0 wt.-%.

US 2010/0316410 describes an imaging member comprising an interfacial layer, the interfacial layer comprising a semi-crystalline polyester resin which is prepared by reacting adipic acid with ethylene glycol and 1,4-cyclohexanedimethanol.

Although polyurethane adhesives are known to show good tensile strength, they are not known for their high fixture strength or green strength. Green strength is usually defined as the early development of bond strength of an adhesive. It indicates that the adhesive bond is strong enough to be handled a short time after the adherents are mated but much before full cure is obtained. It is therefore an important parameter, in particular with regard to the quality of the later product. There has been a number of attempts to increase the green strength of polyurethane adhesive. However, room for improvement is limited in that other properties of the adhesive such as open time and application properties should not be affected. Although employment of high molecular weight acrylates led to the desired increase in green strength, the presence of the high molecular weight acrylates was found to have a negative impact on the jettability of the adhesives.

In light of the above, the object of the present invention is the provision of a polyurethane adhesive which possesses an increased green strength while maintaining the advantageous properties of the polyurethane adhesive such as open time and tensile strength.

It was surprisingly found that this object is solved by employing a mixture of semi-crystalline and highly crystalline polyesters in the preparation of the polyurethane adhesive.

A first object of the present invention is therefore a polyurethane adhesive obtained from a reaction mixture comprising at least one semi-crystalline polyester and at least one highly crystalline polyester, the melting point of the highly crystalline polyester being higher than the melting point of the semi-crystalline polyester.

Crystallization of polymers is a process associated with partial alignment of their molecular chains. In the course of the present invention, semi-crystalline polyester refers to a polyester comprising crystalline and amorphous areas. Highly crystalline polyester refers to a polyester having a high degree of crystallinity with preferably no or only few amorphous areas.

It was surprisingly found that the inventive polyurethane adhesive shows improved green strength compared to commonly used polyurethane adhesives while at the same time meeting the requirements of the appropriate minimal open time of two minutes.

The best results with regard to the balance of green strength and open time were obtained in cases in which the amount of highly crystalline polyester was kept within certain limits. If the amount of highly crystalline polyester was too high, products with a very short open time were observed, which in most cases would be undesirable for the user. In a preferred embodiment of the present invention, the at least one semi-crystalline polyester and the at least one highly crystalline polyester are therefore employed in a weight ratio of 15:1 to 1.5:1, preferably 7:1 to 3:1, in the reaction mixture.

In order to avoid any negative impact on the open time or the application properties it is preferred that the amount of the at least one semi-crystalline polyester does not exceed 30 wt.-% of the reaction mixture. In a preferred embodiment, the at least one semi-crystalline polyester is comprised in the reaction mixture in an amount of 10 to 30 wt.-%, preferably 15 to 25 wt.-%, based on the total weight of the reaction mixture.

In a further preferred embodiment, the at least one highly crystalline polyester is comprised in the reaction mixture in an amount of 2 to 15 wt.-%, preferably 5 to 10 wt.-%, based on the total weight of the reaction mixture. It was surprisingly found that the advantageous open time for which polyurethane adhesives are known could be maintained if the amount of highly crystalline polyester was kept within the claimed range. At the same time, the speed with which the adhesive cools down was found to be increased, resulting in an improved green strength.

There are no special requirements when it comes to the semi-crystalline polyester or the highly crystalline polyester. In contrast, it was surprisingly found that the advantageous green strength could be achieved with a high number of polyesters. Nevertheless, in a preferred embodiment, the at least one semi-crystalline polyester has a hydroxyl value (OH value) of 10 to 50 mg KOH/g, preferably 25 to 40 mg KOH/g. The hydroxyl value is defined as the number of milligrams of potassium hydroxide required to neutralize the acetic acid taken up on acetylation of one gram of a chemical substance that contains free hydroxyl groups. The analytical method used to determine the hydroxyl value traditionally involves acetylation of the free hydroxyl groups of the substance with acetic anhydride in pyridine solvent. The hydroxyl value may be determined according to DIN ISO 4629-2.

In a further preferred embodiment, the highly crystalline polyester has a hydroxyl value of 20 to 100 mg KOH/g, preferably 35 to 60 mg KOH/g.

It was surprisingly found that the application properties of the inventive adhesive were not affected at all if the molecular weight of the semi-crystalline adhesive and the highly crystalline adhesive were kept within a close range of each other, resulting in a homogenous mixture. Therefore, an embodiment of the polyurethane adhesive is preferred wherein the average molecular weight $M_n$ of the semi-crystalline polyester and/or of the highly crystalline polyester is 1000 to 5000 g/mol, preferably 1500 to 4000 g/mol, determined according to DIN 55672-1:2007-08.

The inventive polyurethane is characterized in that the reaction mixture from which it is obtained comprises a mixture of semi-crystalline polyester and highly crystalline polyester which not only differ with regard to their degree of crystallinity but also with regard to their melting points. In a preferred embodiment, the semi-crystalline polyester has a melting point of 30 to 105° C., preferably 50 to 100° C., determined with DSC. The melting point of the highly crystalline polyester is higher, preferably 60 to 130° C., more preferable 65 to 120° C., determined with DSC.

In order to adjust the properties of the inventive polyurethane adhesive, the reaction mixture from which the polyurethane adhesive is obtained may comprise further components such as polyols and acrylates. In a preferred embodiment, the reaction mixture from which the inventive polyurethane adhesive is obtained further comprises at least one of the following components:
   polyol, preferably in an amount of 10 to 30 wt.-%, especially 15 to 25 wt.-%;
   amorphous polyester, preferably in an amount of 10 to 30 wt.-%, especially 15 to 25 wt.-%;
   acrylate, preferably in an amount of 10 to 30 wt.-%, especially 15 to 25 wt.-%.
   NCO-terminated compound, preferably in an amount of 5 to 25 wt.-%, especially 10 to 20 wt.-%;
the wt.-% being based on the total weight of the reaction mixture, respectively.

The NCO-terminated compound is preferably an diisocyanate, and/or an oligomer and/or a polymer of a diisocyanate. In an especially preferred embodiment, the NCO-terminated compound is a prepolymer obtained by reacting a polyol with an isocyanate compound.

In light of the ongoing discussion of sustainability, the avoidance of toxic waste, such as organic solvents, has become an issue which should always be taken into consideration. It was surprisingly found that the inventive polyurethane adhesive is especially suitable to be employed as a hot-melt adhesive which are characterized by their solvent-free use. Therefore, an embodiment is preferred wherein the polyurethane adhesive is a hot-melt adhesive. These adhesives are usually solid at room temperature and, after being melted and applied, react with atmospheric moisture to cure.

A further object of the present invention is a method for the production of a polyurethane adhesive according to the present invention. According to the inventive method, the components of the reaction mixture from which the polyurethane adhesive is obtained are mixed to form a prepolymer which is solid at room temperature. The prepolymer preferably cures in the presence of moisture after being melted.

The inventive polyurethane adhesive is characterized by its increased green strength. A further object is therefore the use of a polyurethane adhesive according to the present invention as a structural adhesive. In a preferred embodiment, the inventive polyurethane adhesive is used in the production of devices which require a high accuracy when assembled, such as electronic devices, in particular handheld electronic devices.

The present invention will be explained in more detail by the following examples which are by no means to be understood as limiting the scope or spirit of the invention.

EXAMPLES

Different polyurethane adhesives were prepared from reaction mixtures containing highly crystalline polyesters and semi-crystalline polyesters. As a comparative example, a reaction mixture was used containing only semi-crystalline polyester. The obtained adhesives were tested with regard to their green strength and compared with commonly used products which contain a semi-crystalline polyester and a high molecular weight polyacrylate. The results are summarized in Table 1.

TABLE 1

|  | Example 1 | Example 2 | Comp.-1 | Comp.-2 |
|---|---|---|---|---|
| highly crystalline | 25 wt.-% (mp*: 70° C.) | 25 wt.-% (mp: 115° C.) | — | — |
| semi-crystalline | 25 wt.-% (mp: 55° C.) | 25 wt.-% (mp: 55° C.) | 25 wt.-% (mp: 96° C.) | — |
| green strength [Mpa] | 0.72 | 0.42 | 0.03 | 0.31 |

*mp: melting point determined with DSC

Green strength was determined by applying two parallel lines of adhesive to the center of the surface of a lap-shear specimen which has been previously cleaned with ethanol and allowed to dry. After the dispensing the adhesive, the lap-shear specimen is assembled and a 2 kg weight block is placed on top of the mating lap-shear specimen for 15 seconds. The samples were cured at 23° C. and 50% relative humidity and the green strength determined after 3 minutes of assembling the lap-shear specimen.

As can be seen from the experimental data as summarized in Table 1, the inventive adhesive obtained from a reaction mixture comprising both, semi-crystalline and highly crystalline polyester, showed a superior green strength than compared to an adhesive obtained from a reaction mixture comprising just a semi crystalline polyester. The green strength of the polyurethane adhesives according to the invention also surpassed the green strength observed using commonly used polyurethane adhesives containing a semi-crystalline polyester and high molecular weight polyacrylate which was first thought to be suitable to improve green strength. Further, it was found that all inventive polyurethane adhesives meet the requirement of a minimum open time of two minutes.

The invention claimed is:
1. A polyurethane adhesive that is the reaction product of a mixture comprising:
   at least one semi-crystalline polyester in an amount of from 15 to 25 wt %, based on the total weight of the mixture; and
   at least one highly crystalline polyester in an amount of from 5 to 10 wt %, based on the total weight of the mixture, wherein:
   the melting point of the at least one highly crystalline polyester is higher than the melting point of the at least one semi-crystalline polyester,
   the at least one semi-crystalline polyester and the at least one highly crystalline polyester are present in the mixture in a weight ratio of from 7:1 to 3:1, and
   the polyurethane adhesive further comprises:
     an acrylate in an amount of from 10 to 30 wt %, based on the total weight of the mixture; and
     an NCO-terminated compound in an amount of from 10 to 20 wt %, based on the total weight of the mixture.

2. The polyurethane adhesive of claim 1, wherein the at least one semi-crystalline polyester has a hydroxyl value (OH value) of from 10 to 50 mg KOH/g, determined according to DIN ISO 4629-2.

3. The polyurethane adhesive of claim 2, wherein the at least one highly crystalline polyester has a hydroxyl value (OH value) of from 20 to 100 mg KOH/g, determined according to DIN ISO 4629-2.

4. The polyurethane adhesive of claim 3, wherein the at least one semi-crystalline polyester has a hydroxyl value (OH value) of from 25 to 40 mg KOH/g and the at least one highly crystalline polyester has a hydroxyl value (OH value) of 35 to 60 mg KOH/g, each hydroxyl value (OH value) determined according to DIN ISO 4629-2.

5. The polyurethane adhesive of claim 1, wherein the average molecular weight $M_n$ of the at least one semi-crystalline polyester and/or the at least one highly crystalline polyester is from 1000 to 5000 g/mol, determined according to DIN 55672-1:2007-08.

6. The polyurethane adhesive of claim 5, wherein the average molecular weight $M_n$ of the at least one semi-crystalline polyester and/or the at least one highly crystalline polyester is from 1500 to 4000 g/mol, determined according to DIN 55672-1:2007-08.

7. The polyurethane adhesive of claim 1, wherein the at least one semi-crystalline polyester has a melting point of from 50 to 100° C. and/or the at least one highly crystalline polyester has a melting point of from 65 to 120° C., each melting point determined by differential scanning calorimetry.

8. The polyurethane adhesive of claim 1, wherein the mixture further comprises at least one of a polyol or an amorphous polyester.

9. The polyurethane adhesive of claim 8, wherein the polyol is in an amount of from 10 to 30 wt %, based on the total based on the total weight of the mixture, and/or the amorphous polyester is in an amount of from 10 to 30 wt %, based on the total based on the total weight of the mixture.

10. The polyurethane adhesive of claim 1, wherein the polyurethane adhesive is a solid at room temperature.

11. A cured reaction product comprising the polyurethane adhesive of claim 1.

12. A device comprising the cured reaction product of claim 11.

13. The polyurethane adhesive of claim 1, wherein the polyurethane adhesive is a hot-melt adhesive.

14. The polyurethane adhesive of claim 1, wherein the polyurethane adhesive is free of water and a solvent.

15. The polyurethane adhesive of claim 1, wherein the polyurethane adhesive has a minimum open time of two minutes.

16. A polyurethane adhesive that is the reaction product of a mixture comprising:
an acrylate in an amount of from 10 to 30 wt %, based on the total weight of the mixture;
at least one semi-crystalline polyester in an amount of 25 wt %, based on the total weight of the mixture; and
at least one highly crystalline polyester in an amount of 25 wt %, based on the total weight of the mixture, wherein:
the at least one semi-crystalline polyester has a melting point of 55° C., determined by differential scanning calorimetry, and/or
the at least one highly crystalline polyester has a melting point of from 70 to 115° C., determined by differential scanning calorimetry.

17. The polyurethane adhesive of claim 16, further comprising an NCO-terminated compound in an amount of from 10 to 20 wt %, based on the total weight of the mixture.

18. The polyurethane adhesive of claim 16, wherein the polyurethane adhesive has a minimum open time of two minutes.

19. The polyurethane adhesive of claim 1, wherein the acrylate is in an amount of from 15 to 25 wt %, based on the total weight of the mixture.

20. The polyurethane adhesive of claim 1, wherein the NCO-terminated compound is diisocyante.

* * * * *